United States Patent [19]

Machurat et al.

[11] 4,322,336

[45] Mar. 30, 1982

[54] COMPATIBLY FILLED/PLASTICIZED POLYMERIC COMPOSITIONS

[75] Inventors: Jean Machurat, Neuville sur Saone; Jean-Claude Morawski, Chassieu; Gerard Soula, Meyzieu, all of France

[73] Assignee: Rhone-Poulenc Industries, Paris, France

[21] Appl. No.: 218,265

[22] Filed: Dec. 19, 1980

[30] Foreign Application Priority Data

Dec. 20, 1979 [FR] France .................................. 79 31219

[51] Int. Cl.$^3$ ................................................ C08K 5/16
[52] U.S. Cl. .................................... 524/104; 525/205; 525/282
[58] Field of Search ........................... 260/32.4; 525/3

[56] References Cited

U.S. PATENT DOCUMENTS 3,546,185 12/1970 Coran et al. ........................ 260/79.5

Primary Examiner—Joseph L. Schofer
Assistant Examiner—Bernard Lipman
Attorney, Agent, or Firm—Burns, Doane, Swecker & Mathis

[57] ABSTRACT

In a filled/plasticized polymeric composition, e.g., a natural or synthetic rubber, the compatibility between reinforcing filler and plasticizer, particularly an oil, is markedly enhanced by incorporating therein a minor amount of an alkenyl succinimide.

18 Claims, 5 Drawing Figures

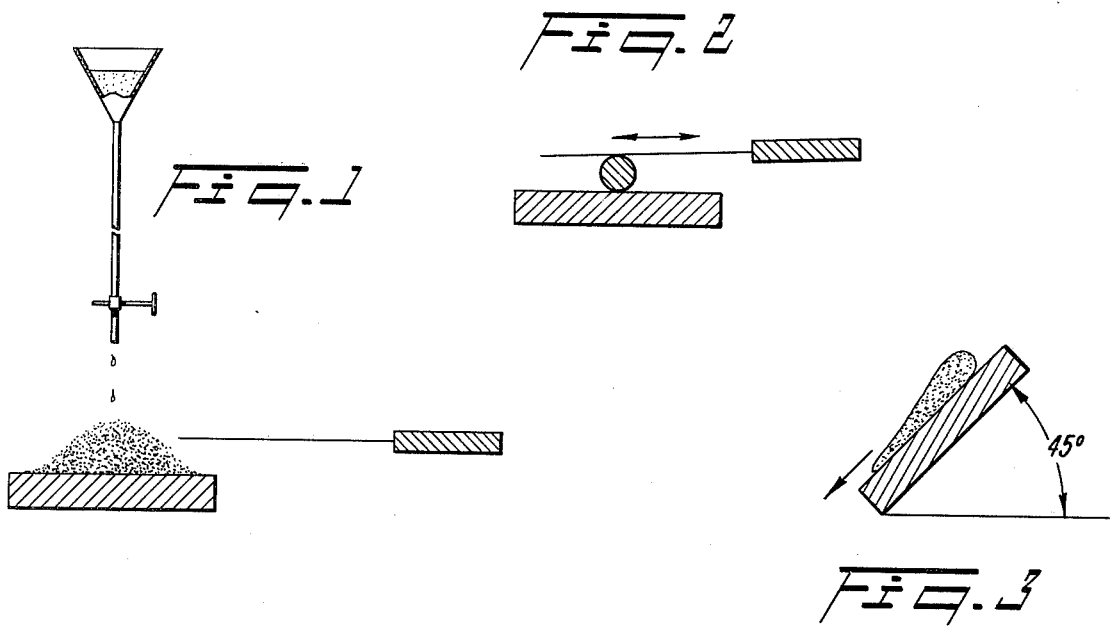
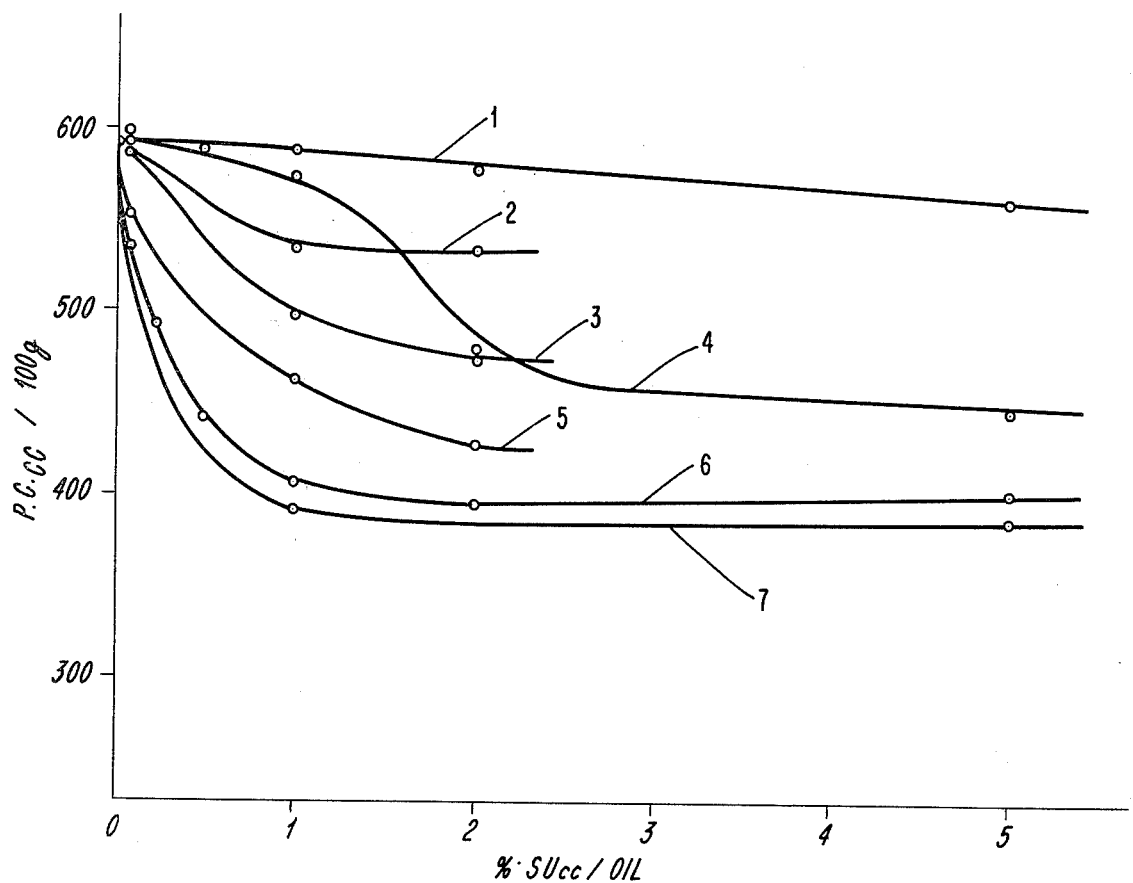

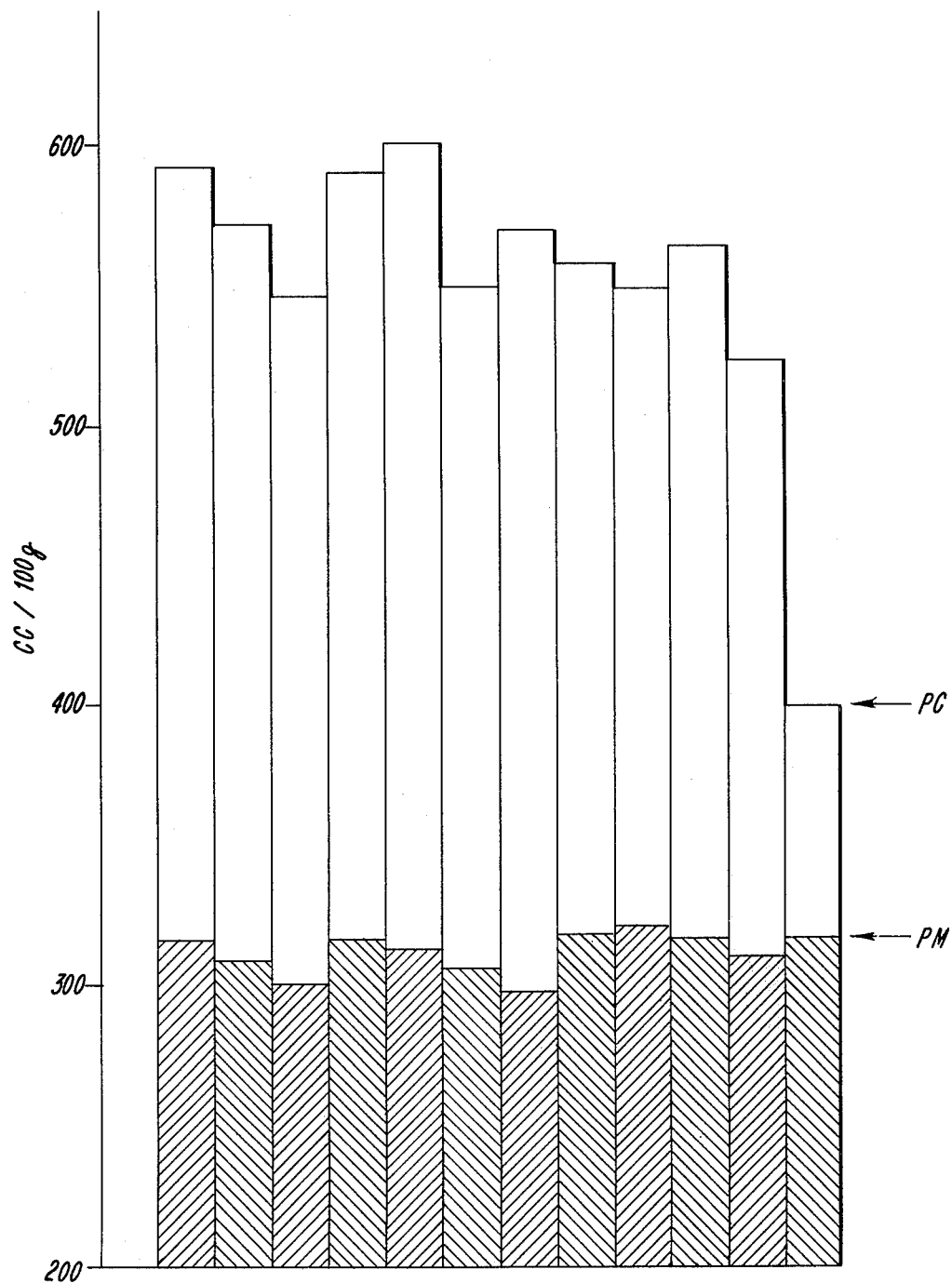

COMPATIBLY FILLED/PLASTICIZED POLYMERIC COMPOSITIONS

BACKGROUND OF THE INVENTION

1. Field of the Invention

The present invention relates to improved filled/plasticized polymeric compositions, and, more especially, to elastomeric compositions wherein the compatibility between the plasticizer, particularly an oil, and the reinforcing filler is markedly enhanced by incorporating therein certain polyamine/alkenyl succinic anhydride additives. The invention also relates to the improved preparation of shaped articles from such compositions, said shaped articles themselves having improved properties.

2. Description of the Prior Art

Plasticizer or extender oils have long been known to contribute greatly to improving the properties of articles, e.g., tires, shaped from elastomeric compositions, such oils typically being incorporated therein in amounts ranging from about 1 to 100 parts by weight, per 100 parts by weight of elastomer.

However, it has proven necessary to improve the compatibility of the plasticizers with the inorganic fillers, and particularly fillers based upon silica particulates. This is because of the generally lipophilic nature of the oils and hydrophilic nature of the silicas, which results in a poor reciprocal or mutual affinity or compatibility.

SUMMARY OF THE INVENTION

Accordingly, a major object of the present invention is the provision of filled/plasticized polymeric, especially elastomeric compositions, and wherein the compatibility between plasticizer and filler is markedly enhanced by incorporating therein a compatibilizing amount of an alkenyl succinimide additive prepared by condensing a polyamine with an alkenyl succinic anhydride, in which the alkenyl radical contains from 3 to 100, and preferably from 3 to 80 carbon atoms.

DETAILED DESCRIPTION OF THE INVENTION

More particularly according to this invention, the polyamines which are condensed to prepare the subject alkenyl succinimides include:

(I) Polyalkylene amines in which the alkylene radicals are straight or branched chain and contain from 2 to 12 carbon atoms, or such polyalkylene amines bearing at least one substituent on the nitrogen atoms thereof, said substituents being hydroxyalkyl or aminoalkyl radicals;

(II) Polyphenylene amines;

(III) Polyoxaalkylene amines in which the oxaalkylene radicals are straight or branched chain and contain 2 to 3 carbon atoms; and (IV) Tertiary aminoalkyl amines having the structural formula:

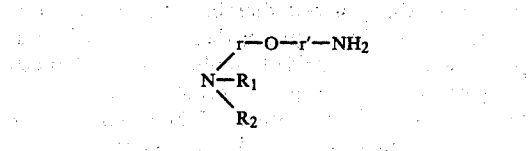

in which
r represents an ethylene or propylene radical,
r' represents a trimethylene or propylene radical,
$R_1$ represents an -r-O-r'-$NH_2$ or -r'-$NH_2$ radical,
$R_2$ represents a $C_2$–$C_4$ alkyl or phenyl, -r-O-r'-$NH_2$ or -r'-$NH_2$ radical Exemplary of the unsubstituted polyalkylene amines (I) are:

[i] Methylene amines, such as trimethylene diamine, tetramethylene diamine, pentamethylene diamine, hexamethylene diamine, heptamethylene diamine, octamethylene diamine, nonamethylene diamine, decamethylene diamine, di(trimethylene) triamine and di(hexamethylene) triamine;

[ii] ethylene amines, such as ethylene diamine, diethylene triamine, triethylene tetramine, tetraethylene pentamine and pentaethylene hexamine.

[iii] propylene amines, such as propylene diamine, dipropylene triamine, tripropylene tetramine, and the like; and

[iv] cyclic homologs thereof of the aminoalkyl piperazine type, such as 1,4-bis(2-aminoethyl)piperazine or 1,4-bis(4-aminobutyl)piperazine.

The ethylene polyamines are particularly useful. Same are described in substantial detail under the title "Diamines and Higher Amines" in *Encyclopedia of Chemical Technology*, 2nd Edition, Kirk and Othmer, Volume 7, pages 27–39, Interscience Publishers, New York (1965). These compounds may be used either alone, or mixed together or with their cyclic homologs.

Exemplary of the polyalkylene amines bearing one or more hydroxyalkyl substituents on the nitrogen atoms thereof are those in which the hydroxyalkyl group or groups contain less than 8 carbon atoms, such as: N-(2-hydroxyethyl)-ethylene diamine, N,N-bis(2-hydroxyethyl)ethylene diamine, mono-hydroxypropyldiethylene triamine, di-hydroxypropyltetraethylene pentamine, N-(3-hydroxypropyl)tetramethylene diamine, and the like.

Exemplary of the polyalkylene amines bearing one or more aminoalkyl substituents on the nitrogen atoms thereof are those in which the aminoalkyl group or groups contain less than 4 carbon atoms, such as: tris(2-aminoethyl)amine, N(2-aminoethyl)tetraethylene pentamine, N,N,N' tris(3-aminopropyl)ethylene diamine, N,N,N',N' tetrakis(3-aminopropyl)ethylene diamine, and N(3-aminoethyl)trimethylene diamine.

Exemplary of the polyphenylene amines (II) are:
[i] phenylene diamines; and
[ii] bis-2,2-(aminophenyl)propane.

Exemplary of the polyoxaalkylene amines (III) are:
[i] 1,10-diamino-4,7-dioxadecane;
[ii] 1,13-diamino-4,7,10-trioxatridecane;
[iii] 1,8-diamino-3,6-dioxa-1,5,8-trimethyloctane; and
[iv] tris-1,2,3-(2-amino-3-methylethoxy)propane, and the like.

Other examples of polyoxaalkylene amines which can be used are described in French Pat. No. 1,547,228.

Exemplary of the tertiary aminoalkyl amines (IV) which can be used are those described in French patent application No. 75.39690, published under No. 2,307,795, and particularly:
[i] tris(3-oxa 6-aminohexyl)amine; and
[ii] N-ethyl-bis(3-oxa-6-aminohexyl)amine.

Of the alkenyl succinic anhydrides which can be used for preparing the alkenyl succinimides, exemplary are those wherein the alkenyl radical is derived from a $C_3$–$C_{30}$ mono-olefin, an oligomer or polymer of a $C_2$–$C_{30}$ mono-olefin or a copolymer prepared from said olefins either together or with dienic or vinyl aromatic comonomers. The preferred alkenyl succinic anhydrides are those derived from oligomers or polymers of ethylene, propylene, 1-butene, isobutene, 1,3-cyclohexyl-1-butene or 2-methyl-5-propyl-1-hexene.

The alkenyl succinimic anhydrides may be prepared in known manner, by condensing maleic anhydride with an olefin, or an oligomer, polymer or copolymer of the said olefin; the synthesis may be carried out by heating (U.S. Pat. No. 3,306,907) or in the presence of chlorine (U.S. Pat. No. 3,231,587) or bromine (French patent application Ser. No. 74.18915, published under Ser. No. 2,273,014); the synthesis may use equally as well monochlorinated or monobrominated polyolefins as the starting materials, as per French Pat. No. 2,042,558.

The technique for condensing alkenyl succinic anhydride with the polyamine for preparing the alkenyl succinimide is carried out in known manner, at a temperature ranging from 80° to 250° C. (U.S. Pat. Nos. 3,172,892 and 3,219,666; French Pat. No. 2,307,845, etc.).

It is preferable to carry out this operation at a temperature ranging from 120° to 240° C., and more preferably from 130° to 230° C., with a molar ratio of polyamine: alkenyl succinimic anhydride of less than 1.

When the amine used contains two primary amino groups, a molar ratio of from 0.4 to 0.6 will make it possible to obtain compositions containing a major proportion of bis-alkenyl succinimides; a molar ratio in the region of 1, and preferably from 0.7 to 0.95, will provide compositions containing a major proportion of mono-alkenyl succinimides. When the amine contains 3 primary amino groups, a molar ratio of from 0.2 to 0.4 will provide a tris-succinimide. When the amine contains 4 primary amino groups, a molar ratio of from 0.15 to 0.3 will provide a tetrakis-succinimide; and so forth.

The plasticizer according to the invention preferably comprises an oil, advantageously one based on aromatic, naphthenic or paraffinic hydrocarbons extracted from certain petroleum fractions.

The filled composition may comprise any base polymer; it may comprise, for example, an elastomeric substance such as natural rubber, or SBR, nitrile, polychloroprene or EPDM rubbers, or any other elastomer.

In elastomeric materials such as copolymers of styrene-butadiene (SBR) (and) natural rubbers, it is known that 1 to 60 parts by weight of oil per 100 parts of elastomer is typically added.

In accordance with the invention, a few percent, particularly from 1 to 5% by weight relative to the plasticizer, is sufficient to obtain significant results.

The filler utilized according to the invention advantageously comprises an inorganic filler, which may either be natural or synthetic.

Of these, fillers based on calcium carbonate, kaolin, silicas and silico-aluminates are exemplary, without intending the invention to be delimited thereto.

This invention, however, is especially applicable to elastomeric compositions filled with the synthetic silicas, particularly with precipitated silicas.*

*e.g., those of copending application, Ser. No. 218,264 [Attorney Docket No. P-794], filed concurrently herewith and assigned to the assignee hereof.

Such silicas are prepared utilizing any one of a number of processes.

In a first type of process, an acidifying agent, such as carbonic anhydride or an inorganic acid, is added to an aqueous silicate solution; the addition is terminated following the appearance of opalescence, and a maturing time is observed before the acidification of the medium is resumed, as, e.g., in the processes described in French Pat. No. 2,208,950 or U.S. Pat. No. 3,503,797.

In a second type of process, the first interruption of acid addition is made beyond the point of opalescence, i.e., between opalescence and gelling, as described in French Pat. No. 2,159,580.

Finally, the addition of acid need not be interrupted, and a solution of alkali metal silicate and a solution of acid in a silicate solution may be added simultaneously, as, e.g., described in French Pat. No. 1,352,354.

There are obviously many possible modifications to these processes which make it possible to control the properties of the resultant silica particulates, and the above description is not in any way intended to restrict the type of silica which may be used within the ambit of the present invention.

The following are non-limiting examples of actual preparations of several succinimides according to the invention.

Various succinimides were prepared, as set forth in Table I; same were prepared from various amines and the two anhydrides:

(1) tetrapropenyl succinic anhydride (anhydride I); and (2) polyisobutenyl succinic anhydride (anhydride II).

Thus, the following succinimides were prepared in the following manners:

Succinimide:

832 g of tris(3-oxa-6-aminohexyl)amine (2.6 moles) and 500 ml of xylene were placed in a 5-liter 3-necked flask, fitted with a mechanical agitator, a bromine funnel and a Dean and Starck apparatus to eliminate the water of reaction. The mixture was heated to reflux; then 2075 g of anhydrous tetrapropenyl succinic anhydride (7.8 mole) dissolved in 350 ml of xylene were added over two hours. After 4 hours of reaction, all of the water of the reaction had been eliminated. Xylene was then evaporated under reduced pressure (20 mm Hg).

Proportions: nitrogen content=5.21%; theory 5.26%; residual acid no.=6.2 mg KOH/g.

Succinimide 2:

The following reaction was carried out, using the apparatus described in experiment 1.

845 g of 1-10-diamino-4,7-dioxadecane (4.8 moles) and 250 ml of xylene were placed in the flask. The mixture was heated to reflux (of the xylene), then 1,596 g of tetrapropenyl succinic anhydride (6 moles) dissolved in 600 ml of xylene were added over 2 hours. After 5 hours of heating at 150° C. all of the water of the reaction was eliminated. The xylene was evaporated at reduced pressure (30 mm Hg). The product obtained was filtered over Clarcel.

Proportions: nitrogen=5.72%; theory=5.75%; residual acid no.=3.25.

Succinimide 3:

The same apparatus as described in experiment 1 was used, and 336 g of ethylene diamine (5.6 moles) and 200 ml of xylene were placed therein. The mixture was heated to reflux of the xylene; then 1,862 g of tetrapropenyl succinic anhydride (7 moles) dissolved in 600 ml of xylene were added over 1 hr, 30 min.

Heating was continued until all of the water from the reaction was eliminated, as well as the xylene.

The product obtained, which was slightly turbid, was filtered through Clarcel at 120° C.

Proportions: nitrogen=6.5%; theory=7.5%; residual acid no.=1.3.

ing maleic anhydride with a polyisobutene having a molecular weight in the vicinity of 1000.

TABLE I

| Succinimide | Amine | Anhydride | Molar ratio amine/anhdride | Total nitrogen measured % | Total nitrogen theory % | Residual acid no. | Appearance of resultant product |
|---|---|---|---|---|---|---|---|
| 1 | N(CH$_2$—CH$_2$—O—(CH$_2$)$_3$—NH$_2$)$_3$ | I | 1.1 | 8.6 | 8.9 | 2.2 | fluid colorless liquid |
| 2 | NH$_2$—(CH$_2$)$_3$—O—(CH$_2$)—O—CH$_2$)$_3$—NH$_2$ | I | 0.8 | 6.5 | 7.6 | 1.3 | viscous colored liquid |
| 3 | NH$_2$—CH$_2$—CH$_2$—NH$_2$ | I | 0.8 | 5.72 | 5.75 | 3.25 | viscous colored liquid |
| 4 | NH$_2$—⟨ ⟩—CH$_2$ | I | 0.8 | 6.5 | 6.7 | 7 | red solid |
| 5 | NH$_2$—(CH$_2$)$_6$—NH—(CH$_2$)$_6$—NH$_2$ | I | 0.8 | 7.2 | 7.3 | 4 | viscous highly colored liquid |
| 6 | tetraethylene pentamine | I | 0.8 | 13.1 | 14 | | viscous colored liquid |

Succinimide 4:

The following reaction was carried out with the apparatus described in experiment 1.

605 g of para diamino benzene (5.6 moles) and 400 ml of xylene were placed in the flask. The xylene was heated to reflux; then 1862 g of tetrapropenyl succinic anhydride (7 moles) dissolved in 600 ml of xylene were added over 1 hr, 30 min. After 4 hours of reaction all of the water from the reaction was eliminated. The xylene was evaporated at reduced pressure (30 mm Hg).

The product obtained was solid when cold and had a red color.

Proportions: nitrogen=6.5%; theory=6.69%; residual acid no.=6.85.

Succinimide 5:

The following reaction was carried out with the apparatus described in experiment 2.

942 g of bis-hexamethylene triamine and 400 ml of xylene were placed in the flask. The mixture was heated to reflux of the xylene; then 1,490 g of tetrapropenyl succinic dissolved in 400 ml of xylene were added over 1 hr, 30 min. After 4 hours a 150° C., all of the water from the reaction had been eliminated. The xylene was evaporated at reduced pressure (15 mm Hg).

Proportions: total nitrogen=7.1%; theory=7.3%; residual acid no.=3.87 mg KOH/g.

Succinimide 6:

A 2-liter 3-necked flask was used, fitted with a mechanical agitator, a bromine funnel, a thermometer and a distillation head, followed by a condenser and a receiver. 665 g of tetrapropenyl succinic anhydride (i.e., 2.5 moles) were poured into the flask and heated to 130° C.

189 g of tetraethylene pentamine (i.e., 2 moles) were then introduced over 30 min. The mixture was brought to 160° C. at a pressure of 25 mm Hg. When all of the water formed in the course of the reaction had distilled (3 hours), the mixture was cooled.

The nitrogen analysis was as follows: theory=14%; measured=13.8%.

Infra-red analysis revealed that all of the succinic anhydride functions had reacted. The presence of characteristic bands of the succinimide group was noted.

Succinimide 7:

This was a commercial product corresponding to mono-(polyisobutenyl succinimide) derived from tetraethylene pentamine and a succinic polyisobutenyl anhydride having an acid number 74, obtained by condens- In order to further illustrate the present invention and the advantages thereof, the following specific examples are given, it being understood that same are intended only as illustrative and in nowise limitative.

EXAMPLE 1

A first serie of tests was carried out to illustrate the influence of a succinimide according to the invention on the improvement in oil/filler compatibility, using the same oil and the same filler.

The so-called "wetting point WP and flow point FP" method was used to demonstrate this improvement. The method is described by Patton in *Point Flow and Pigment Dispersion*—Interscience Publishers, John Wiley and Sons—New York 1964.

By this method, the wetting point WP is determined by adding oil, drop-by-drop, to a known quantity of filler. The oil gradually displaces the air and the mixture of filler and oil forms a paste. A small cylinder is formed with the paste, which can be rolled under a spatula without breaking or sticking to the support (see FIGS. 1, 2 and 3).

The results are expressed in cm$^3$ of oil per 100 g of filler.

When the wetting point has been determined thus, the addition of oil is continued until the oil/filler mix is fluid enough to flow freely on a plane inclined at 45°. The results are expressed in cm$^3$ of oil per 100 g of filler, and the difference Δ (FP-WP) between the flow point and the wetting point is calculated. Affinity improved as the value Δ (FP-WP) decreases.

The oil was a Dutrex 729 FC oil having a density of 1.015 at 15°-14° C., in accordance with ASTM D 1298.

Other characteristics of the oil were:
Kinematic viscosity:
  20° C. cs in accordance with ASTM D 445 8440;
  50° C. cs in accordance with ASTM D 445 268.

The silica was a precipitated silica, marketed by the assignee hereof under the name of Zeosil 45. The principal properties of the silica were as follows:

| [i] | Weight loss when heated to 900° C. | 12.5 max. |
|---|---|---|
| [ii] | pH (5g/100 cc) | 6.5 ± 0.3 |
| [iii] | BET surface area | 200 m$^2$/g |
| 8 iv] | Diameter of ultimate particles | 20 m μ m |
| [v] | Uptake of DOP oil (dioctyl phthalate) | at least 300 cc/100 g |
| [vi] | Amount of particles of a size as to | |

The results obtained from testing the seven additives according to the invention are depicted in FIG. 4 in respect of the flow points.

It will be appreciated that these are lowered considerably. Given that the wetting points are virtually the same, i.e., in the vicinity of 314, FIG. 4 dramatically illustrates the markedly enhanced results obtained per this invention.

EXAMPLE 2

In a second series of tests, the influence of the two succinimides 6 and 7 was then compared with various known additives. The results are reported in Table II and illustrated in FIG. 5 (which reflects the results for succinimide 6 only, the samples being reported from left to right beginning with the reference).

TABLE II

| ADDITIVES | Reference oil only | oil + butyl glycol | | oil + silicon | | oil + methanolamine | | oil + mercaptosilane | | oil + NP 6 | |
|---|---|---|---|---|---|---|---|---|---|---|---|
| % in oil | — | 2 | 5 | 2 | 5 | 2 | 5 | 2 | 5 | 2 | 5 |
| WP | 315 | — | 308 | 306 | 300 | 316 | 314 | 312 | 311 | 308 | 304 |
| FP | 592 | — | 572 | 560 | 546 | 594 | 590 | 600 | 600 | 560 | 550 |
| Δ FP—WP | 277 | — | 264 | 254 | 246 | 278 | 276 | 288 | 289 | 252 | 246 |

| ADDITIVES | oil + Cemulsol NP2 | | oil + Cemulsol NP 9 | | oil + Cemulsol FM 33 | | oil + Pluronic L 61 | | oil + Tetronic 704 | | oil + additive 6 | | oil + additive 7 | |
|---|---|---|---|---|---|---|---|---|---|---|---|---|---|---|
| % in oil | 2 | 5 | 2 | 5 | 2 | 5 | 2 | 5 | 2 | 5 | 2 | 5 | 2 | 5 |
| WP | 300 | 296 | 314 | 316 | 316 | 318 | 314 | 314 | 308 | 306 | 314 | 316 | 314 | 314 |
| FP | 566 | 570 | 566 | 558 | 560 | 548 | 572 | 564 | 540 | 522 | 398 | 396 | 380 | 380 |
| Δ FP—WP | 266 | 274 | 252 | 242 | 244 | 230 | 258 | 250 | 232 | 216 | 84 | 80 | 66 | 66 |

NP = nonyl phenol with 2 OE, 9 OE; FM ethoxyl propylene alcohol, base $C_{12}$; Pluronic L61: mixed ethylene oxide/propylene oxide condensate, 10% ethylene oxide - 90% propylene oxide - average WP of propylene oxide 1 750; Tetronic 704 condensation of ethylene oxide and propylene with ethylene diamine.

EXAMPLE 3

Table III below illustrates the effect of the proportion of additive to oil, while continuing to use the same filler, the same oil and additive 6.

It will be seen that very significant results are obtained from that stage where 1% of additive was added. These results are also reported in FIG. 4.

TABLE III

| ADDITIVE | Reference oil only | OIL + additive 1 | | | | | |
|---|---|---|---|---|---|---|---|
| % in oil | 0 | 0.1 | 0.2 | 0.5 | 1.0 | 2.0 | 5.0 |
| WP | 315 | 314 | 316 | 314 | 315 | 314 | 316 |
| FP | 592 | 540 | 492 | 448 | 404 | 398 | 396 |
| FP—WP | 277 | 226 | 176 | 134 | 89 | 84 | 80 |

EXAMPLE 4

Two other fillers were employed, while again continuing to use the same oil and the same additive. The first was a micronized silica marketed under the name of Tixosil 33 J. This had the same BET surface area as the previous silica and an identical ultimate particle size, but its DOP uptake was high, 400 cc/100 g.

The second filler was an amorphous silica-aluminate (Zeolex 25), obtained by precipitation and having the following chemical composition by weight:

| | |
|---|---|
| $SiO_2$ | 80.2 |
| $Al_2O_3$ | 9.3 |
| $Na_2O$ combined | 5.7 |
| water | 4.8 | and the following properties:

| | | |
|---|---|---|
| [i] | Weight loss on heating (900° C.) | 12 max. |
| [ii] | pH (5 g/100 cc) | 9.8 ± 0.2 |
| [iii] | BET surface area | 160 m²/g |
| [iv] | Diameter of ultimate particles | 20 m μ m |
| [v] | Uptake of oil (DOP) | at least 230 cc/100 g |
| [vi] | Amount of particles of a size as to be collected on a screen as in ASTM 325 | 5% |

Table IV below records the results obtained, again using the same additive (6).

TABLE IV

| Filler | Additive % | WP | FP | Δ | R = FP/WP |
|---|---|---|---|---|---|
| Zeolex 25 | 0 | 210 | 590 | 380 | 2.8 |
| | 1 | 192 | 270 | 78 | 1.40 |
| | 2 | 186 | 260 | 74 | 1.40 |
| Tixosil 33 J | 0 | 398 | 1256 | 858 | 3.15 |
| | 1 | 404 | 694 | 290 | 1.71 |
| | 2 | 402 | 608 | 206 | 1.51 |
| | 5.0 | 406 | 572 | 166 | 1.40 |

These results thus corroborate those previously reported.

EXAMPLE 5

In this example, the silica was the same as that used in the beginning experiments (Zeosil 45), the additive was the same as before (additive 6), but the nature of the plasticizer was changed by utilizing dioctylphthalate (DOP) and an alkylbenzene (Progiline 151).

The results obtained are reported in Table V below:

TABLE V

| Oil | Additive % | WP | FP | Δ | R* = FP/WP |
|---|---|---|---|---|---|
| DOP | 0 | 328 | 646 | 318 | 1.97 |
| | 2 | 324 | 386 | 62 | 1.19 |
| Alkylbenzene | 0 | 332 | 696 | 362 | 2.09 |
| | 2 | 336 | 470 | 134 | 1.40 |

*The closer R is to 1, the more marked is the improvement.

The example thus evidences that various oils and plasticizers may be used, and that the effect consistent herewith is maintained.

EXAMPLE 6

This example used the same plasticizers as Example 5, namely, dioctylphthalate and alkylbenzene, in the same properties and with the same additive 6, but used two completely different fillers. The first was a white kaolin clay marketed under the name of Argilec B 24, with the following properties:

| Physical properties: | |
|---|---|
| (1) Particle size: | |
| Distribution of particles according to diameter: | |
| above 20 microns | 0 |
| from 20 to 50 microns | 2% |
| from 15 to 9 microns | 1% |
| from 9 to 4.5 microns | 8% |
| from 4.5 to 2 microns | 11.5% |
| from 2 to 1 micron | 8.5% |
| below 1 micron | 69% |
| (2) Apparent density: | |
| not compacted | 0.326 |
| compacted | 0.460 |
| (3) Humidity: | |
| below 0.5% at bagging stage; | |
| equilibrium after normal recovery: | |
| approximately 1% | |
| (4) pH: | |
| from 5 to 6 | |
| (5) Chemical analysis: | |
| weight loss on heating | 12.97 |
| silica | 45.91 |
| (including 1.50% free silica) | |
| titanium anhydride | 1.39 |
| alumina | 37.04 |
| iron sesquioxide | 1.58 |
| lime | 0.41 |
| magnesia | traces |
| sodium oxide, potassium oxide | 0.89 |
| lead | 0.00 |
| copper | 0.00 |
| manganese as MnO | 0.003 |
| Total | 100.193 |

The average percentage of free silica, 1.50% was for the greater part in colloidal and thus non-abrasive form.

The second filler used in this example was a Champagne white chalk which had undergone grinding, advanced selection and surface treatment and is marketed under the name of OMYA BSH.

| Chemical composition before treatment: | |
|---|---|
| $CaCO_3$ | 98.5 to 98.7% |
| HCl insoluble | 0.09% |
| silica $(SiO_2)$ | 0.08% |
| $Fe_2O_3$ | 0.20% |
| $Al_2O_3$ | 0.15% |
| MgO | Traces |
| Mn maximum | 0.02% |
| maximum humidity | 0.10% |
| $SO_4$ | 0.15% |
| Physical and physico-chemical properties: | |
| Fineness: | |
| passing through 325 screen | 99.99% |
| % of particles less than 10 μm in diameter | 99.9% |
| % of particles less than 5 μm in diameter | 85 to 87 |
| % of particles less than 3 μm in diameter | 60 to 68 |
| mean statistical diameter of particles | 1 to 3 μm |
| Shape of particles: fragments of coccoliths | |
| Specific weight: 2.7 | |
| Apparent density at minimum volume: 1.1 | |
| Index of refraction: 1.5 | |
| Whiteness when dry: (green Tristimulus filter): 84.5 ± 1 | |
| (MgO = 100) | |
| Opacifying power: strong | |
| Absorption of DOP: 18 to 19 g per 100 g of powder. | |

Results obtained are reported in Table VII below:

TABLE VI

| | Oil | % additive | WP | FP | Δ | R = WP/FP |
|---|---|---|---|---|---|---|
| KAOLIN | DOP | 0 | 70 | 150 | 80 | 2.14 |
| | | 2 | 70 | 140 | 70 | 2.00 |
| | Alkyl-benzene | 0 | 70 | 160 | 90 | 2.29 |
| | | 2 | 70 | 145 | 75 | 2.07 |
| CHALK | DOP | 0 | 40 | 80 | 40 | 2.00 |
| | | 2 | 40 | 75 | 35 | 1.88 |
| | Alkyl-benzene | 0 | 45 | 85 | 40 | 1.89 |
| | | 2 | 45 | 75 | 30 | 1.67 |

Again, a substantial improvement in compatibility between oil and filler was noted, due to the additive according to the invention.

Trials were also carried out on a rubber mix. The following tests were carried out:

STATIC AND DYNAMIC MECHANICAL TESTS:

(1) Monsanto Rheometer (ASTM D 2084):

Measured the rheological properties of the mix during vulcanization:

- Minimum torque (mC): consistency of unvulcanized mix ("crude" mix) at testing temperature;
- Maximum torque (MC): consistency of mix after cross-linking;
- Δ torque: MC − mC, related to the cross-linking rate;
- Induction Period: time taken to initiate cross-linking at testing temperature;
- Index: related to the speed of vulcanization (optimum time - induction period);
- Optimum time: $X = \frac{(MC - mC) \times 90}{100} + mC$ Torque X ⟶ Y minutes
(ordinate)        (abscissa)
Y mn = optimum time.

These properties are described in particular in the *Encyclopedia of Polymer Science and Technology*, Volume 12, page 265 (Interscience Publishers—John Wiley & Sons, Inc.).

(2) Static properties:

Those which are measured in accordance with the following standards:

(a) ASTM D 412-51 T

Resistance to breaking $kg/cm^2$

Elongation %

Modulus (b) ASTM D 2240-75

Shore A hardness (c) NF T 47-126

Tear strength (d) DIN 53516

Abrasion (resistance to)

(3) Dynamic properties:

ASTM D 623-67

Goodrich Flexometer

This apparatus is for subjecting a vulcanizate to alternating deformation to determine its resistance to fatigue.

(a) Static compression (SC %): deflection under constant load.

(b) Permanent deformation (PD %): % of residual deformation after test.

(c) Dynamic compression (DC %): % of deformation during test.

ODC: Dynamic compression at beginning of test.
FDC: Dynamic compression at end of test.
ΔDC=FDC−ODC development of dynamic compression; related to resistance to fatigue.

(d) ΔT base: ΔT; between the temperature at the surface of the sample (at its base) and the temperature of the chamber.

(e) ΔT core: ΔT; between the temperature at the core of the sample and the temperature of the chamber.

(f) Test conditions:
load 24 lbs, deflection 22.2%, frequency 21.4 Hz, temperature of chamber=50° C.

| | | |
|---|---|---|
| [ix] | Succinimide in accordance with tests (see Table II) | |
| [xii] | Sulfur | 2.8 |

The process was carried out in a 1-liter internal BANBURY mixer, then continued in a cylinder mixer.

The results are reported in Table VII below.

It will be seen, in particular, that the minimum torque drops as a function of the amount of succinimide, corresponding to a reduction in viscosity, without any marked change in the other properties. It will also be noted that there is a favorable effect on the modulus, which increased; on heating, which decreased (ΔT core); and on the permanent deformation, which was reduced.

TABLE VII

| SUCCINIMIDE (as % of silica) | 0 | | 1 | | 2 | | 3 | | 4 | |
|---|---|---|---|---|---|---|---|---|---|---|
| Rheometer at 150° C. Torque: Min Max | 18.5–94.0 | | 19–97 | | 17.5–94 | | 15–93 | | 11–88.5 | |
| ΔTorques | 75.5 | | 78 | | 76.5 | | 78 | | 77.5 | |
| Induction period-Index | 9mn30s–3mn-15s | | 10mn–4mn15s | | 9mn30s–3mn | | 8mn–5mn | | 6mn30s–6mn | |
| Optimum | 12mn45s | | 14mn15s | | 13mn30s | | 13 mn | | 12mn30s | |
| STATIC PROPERTIES | | σ | | σ | | σ | | σ | | σ |
| Resistance to breaking kg/cm² | 96.2 | 5.8 | 81.8 | 4.5 | 89.8 | | 79.0 | 4.6 | 84.5 | 4.8 |
| Shore A hardness | 67 | — | 66 | — | 65 | — | 66 | — | 66 | — |
| Modulus at 100% All | 15.3 | 0.8 | 17 | 1.4 | 17 | 1.0 | 17 | 0.6 | 18 | 1.1 |
| Modulus at 300% All | 37.3 | 1.2 | 45.5 | 2.7 | 45.5 | 1.3 | 46.5 | 0.8 | 48 | 3.6 |
| Elongation % | 567 | 23 | 440 | 26.5 | 456 | 32 | 435 | 15 | 880 | 23 |
| Abrasion DIN (losses) | 168 | — | 169 | — | 169 | — | 170 | — | 166 | — |
| GOODRICH FLEXOMETER | | | | | | | | | | |
| Static compression % (SC) | 11 | | 11 | | 10.9 | | 10.4 | | 12.3 | |
| Original dynamic compression (ODC) % | 8 | | 5.5 | | 5.95 | | 5.55 | | 7.4 | |
| Final dynamic compression (FDC) % | 9.8 | | 7.3 | | 8.25 | | 7.15 | | 9.2 | |
| ΔFDC - ODC | 1.8 | | 1.8 | | 2.30 | | 1.55 | | 1.80 | |
| ΔT. base °C. | 27 | | 26 | | 27.5 | | 27.0 | | 27.0 | |
| ΔT. core °C. | 105 | | 97.5 | | 104.5 | | 102.5 | | 100.0 | |
| Permanent deformation % | 5.05 | | 4.05 | | 4.35 | | 3.7 | | 3.5 | |

σ = standard deviation

EXAMPLE 7

In this example, the filler used was a silica of the Zeosil 45 type, and the succinimide was #6.

The following recipe was used in this example (in parts by weight):

| | | |
|---|---|---|
| [i] | Butadiene-styrene copolymer extended with oils + (SBR 1712) | 60.00 |
| [ii] | Polybutadiene (BR 1220) | 40.00 |
| [iii] | Silica | 60.00 |
| [iv] | Aromatic oil (Dutrex 729 F-C) | 20.00 |
| [v] | Zinc oxide | 4.00 |
| [vi] | Stearic acid | 1.50 |
| [vii] | N-isopropyl-N-phenyl-para-phenylenediamine (antioxidant PERMANAX IPPD) | 1.50 |
| [viii] | N-(1,3-dimethyl butyl)-N'-phenyl-p-phenylenediamine (antioxidant PERMANAX 6 PPD) | 1.5 |
| [ix] | Polyethylene glycol (PEG 4000) | 3.00 |
| [x] | N-cyclohexyl-2-benzothiozyl sulphenamide (Vulcafor CBS) | 3.00 |

EXAMPLE 8

This example, while continuing use of the same silica, the same oil and the same additive, used a natural rubber.

The formulation used was as follows, in parts by weight:

| | | |
|---|---|---|
| [i] | Natural rubber SMR 5$_L$ | 100.00 |
| [ii] | Stearic acid | 1.50 |
| [iii] | Zinc Oxide | 4.00 |
| [iv] | Antioxidant (PERMANAX 6 PPD) | 1.5 |
| | IPPD | 1.5 |
| [v] | Vulcafor CBS | 1.80 |
| [vi] | Oil DUTREX 729 FC | 20.00 |
| [vii] | Silica | 60.00 |
| [viii] | Polyethylene glycol (PEG 4000) | 3.00 |
| [ix] | Sulfur | 2.80 |
| [x] | Succinimide | as in Table 8 |

The treatment was the same as in Example 7.

TABLE VIII

| ADDITIVES (as % of silica) | 0.0 | 2.0 | 4.0 | 6.0 |
|---|---|---|---|---|
| Rheometer at 150° C. Torque: Min Max | 24–91 | 21–85 | 16–83 | 11–76 |
| Torques | 67 | 64 | 67 | 65 |

TABLE VIII-continued

| Induction period | 7mn45s-9mn30s | | 7mn-8mn30s | | 4mn45s-8mn30s | | 4mn45s-8mn30s | |
|---|---|---|---|---|---|---|---|---|
| Optimum time | 17mn15s | | 15mn30s | | 13mn15s | | 13mn | |
| STATIC PROPERTIES | | σ | | σ | | σ | | σ |
| Resistance to breaking kg/cm² | 205 | 13 | 207 | 11.6 | 209 | 9.3 | 207 | 6.7 |
| Shore A hardness | 72 | | 68 | | 68 | | 67 | |
| Modulus at 100% All | 14 | 0.3 | 15 | 1.3 | 14.5 | 0.8 | 14 | 1.5 |
| Modulus at 300% All | 31 | 1.4 | 35 | 1.6 | 34 | 2.9 | 31 | 3.80 |
| Elongation % | 728 | 20.5 | 715 | 16.5 | 722 | 32 | 734 | 37 |
| Tearing kg/cm | 36.2 | 2.2 | 35.0 | 1.8 | 35.9 | 4.1 | 35.5 | 3.5 |
| Abrasion DIN (losses) | 232 | | 235 | | 229 | | 251 | |
| GOODRICH FLEXOMETER L-24 lbs D-22.2% F-21.4 Hz γ - 50° C. | | | | | | | | |
| Static compression % | 10.0 | | 10.3 | | 10.2 | | 11.9 | |
| Original dynamic compression % | 14.1 | | 11.3 | | 11.0 | | 11.2 | |
| Final dynamic compression % | 39.4 | | 28.4 | | 21.5 | | 20.7 | |
| ΔFDC-ODC | 25.3 | | 17.1 | | 10.5 | | 9.5 | |
| ΔT. Base | 73 | | 45 | | 33.5 | | 27.0 | |
| ΔT. Core | 150 | | 128 | | 105 | | 94.0 | |
| Permanent deformation | 33.1 | | 18.0 | | 11.87 | | 10.3 | |

It will be seen that the minimum torque decreases considerably from 24 to 11. The very positive effect on the reduction in core heating should also be noted.

EXAMPLE 9

Finally, a test run was carried out by incorporating the same succinimide, in the following formulation, while retaining the same oil and the same silica:

| [i] | 70/30 Styrene-butadiene rubber containing 30% of block polystyrene (Solprene TR 411) | 50.0 |
|---|---|---|
| [ii] | Styrene-butadiene thermoplastic elastomer of the simplified general formula SSS-BBBB-SSS (Careflex IR - 4122) | 50 |
| [iii] | Silica | 5.0 |
| [iv] | Oil | 20.00 |
| [v] | Anti - UV | 0.2 |
| [vi] | Antioxidant | 0.2 |
| [vii] | Succinimide according to invention | 0; 0.2; 0.5; 1.0; 2.0 |

The material was treated as follows:
The blends prepared in an internal laboratory mixer (1 liter) were injected under the following conditions:

| Feed temperature | 155° C. |
|---|---|
| Temperature | 160° C. |
| Temperature | 165° C. |
| Mold 100 × 100 × 4 | 165° C. |

The results obtained are summarized in Table IX below:

TABLE IX

| SUCCINIMIDES | 0 | 0.2 | 0.5 | 1.0 | 2.0 |
|---|---|---|---|---|---|
| Resistance to breaking kg/cm² | 98 | 118 | 113 | 123 | 130 |
| Shore A hardness | 68 | 67 | 68 | 68 | 67 |
| Modulus 300% | 21 | 15 | 14 | 16 | 14 |
| Elongation % | 1020 | 1230 | 1280 | 1350 | 1340 |
| Surface condition | Poor | Poor | Poor | Average | Good |
| Color | light yellow | light yellow | light yellow | light yellow | light yellow |
| Resistance to tearing kg/cm | 11 | 21.5 | 18.5 | 20.5 | 19 |

EXAMPLE 10

This example, used a natural rubber, and additive brought on a silica. The formulation used was as follows, in parts by weight:

| (i) | Natural rubber SMR 5L | 100.00 |
|---|---|---|
| (ii) | Stearic acid | 1.50 |
| (iii) | Zinc oxide | 4.00 |
| (iv) | Antioxidant (Permanax 6PPD) | 1.50 |
| | (Permanax IPPD) | 1.50 |
| (v) | Vulcafor CBS | 1.50 |
| (vi) | Oil Dutrex | 20.00 |
| (vii) | precipitated silica (BET area) of 172 m2/g) | 60.00 |
| (viii) | Polyethylene glycol (PEG 4000) | 3.00 |
| (ix) | Sulfur | 2.80 |
| (x) | Succinimide | see tables 10 and 11. |

TABLE 10

| | BANBURY ONE MIXING | | BANBURY - DOUBLE MIXING | |
|---|---|---|---|---|
| Succinimide % as % of active product | 0.0 | 4.0[1] | 0.0 | 4.0[1] |
| Rheometer Monsanto at 150°0 C. | | | | |
| Torque Min. | 24.0 | 15.5 | 12.5 | 21.5 |
| Torque Max. | 81.0 | 75.0 | 82.0 | 69.5 |
| Δ Torque | 57.0 | 59.5 | 60.5 | 57.0 |
| Scorch time = T + 2 | 8.0 | 4.75 | 9.25 | 5.75 |
| T.90 - T 2 | 11.5 | 9.75 | 10.50 | 9.50 |
| Optimum time = T.90 | 19.5 | 14.5 | 19.75 | 15.25 |
| Resistance to breaking kg/cm² | 201 | 214 | 196 | 196 |
| Hardness shore A | 66 | 62 | 64 | 62 |
| Modulus 100% kg/cm² | 15 | 17 | 14 | 15 |
| Modulus 300% | 35 | 40 | 37 | 39 |
| Elongation | 672 | 684 | 687 | 642 |
| Tearing kg/cm | 52 | 65 | 61 | 68 |
| Abrasion DIN | 285 | 276 | 300 | 305 |

[1] 4% as active product, 6% as product on silica.

TABLE 11

| ADDITIVES | BANBURY - ONE MIXING | | BANBURY - DOUBLE MIXING | |
|---|---|---|---|---|
| Additives | 0.0 | 4.0 | 0.0 | 4.0 |
| Dynamic properties Goodrich flexometer | | | | |

TABLE 11-continued

| ADDITIVES | BANBURY - ONE MIXING | | BANBURY - DOUBLE MIXING | |
| --- | --- | --- | --- | --- |
| State compression | 13.3 | 12.2 | 13.6 | 24.5 |
| Original dynamic compression | 14.7 | 12.1 | 14.5 | 14.2 |
| Final Dynamic compression | 40 | 25.7 | 40 | 26.1 |
| Δ CFD - CDO % | 25 | 13.6 | 25.5 | 11.9 |
| ΔT. base 0° C. | >60 | 34 | 53.5 | 30.5 |
| ΔT. core | >150 | 107.5 | 130 | 93.5 |
| Permananentdeformation | 22.5 | 12.3 | 21.7 | 12.8 |

It will be seen that, with the succinimide according to the invention, resistance to breaking improves steadily in relation to the amount of additive.

Resistance to tearing is very markedly enhanced from 11 to 20 kg, whatever the amount of additive.

The surface condition steadily improved.

And after the material had been stored for several weeks, no sweating was observed and the color remained clear and stable.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a filled/plasticized polymeric composition of matter, the improvement which comprises a filler/plasticizer compatibilizing amount of an alkenyl succinimide, said alkenyl succinimide being the condensation product of a polyamine with an alkenyl succinic anhydride wherein the alkenyl moiety contains from 3 to 100 carbon atoms.

2. The composition of matter as defined in claim 1, the polymer being elastomeric, and the plasticizer being an oil.

3. The composition of matter as defined by claim 1 or 2, said polyamine being a polyalkylene amine wherein the alkylene radicals are straight or branched chain and contain from 2 to 12 carbon atoms.

4. The composition of matter as defined in claim 3, said polyalkylene amine bearing at least one hydroxyalkyl or aminoalkyl substituent on the nitrogen atoms thereof.

5. The composition of matter as defined by claim 1 or 2, said polyamine being a polyphenylene amine.

6. The composition of matter as defined by claim 1 or 2, said polyamine being a polyoxaalkylene amine in which the oxaalkylene radicals are straight or branched chain and contain 2 to 3 carbon atoms.

7. The composition of matter as defined by claim 1 or 2, said polyamine being a tertiary aminoalkyl amine having the structural formula:

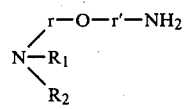

in which r represents an ethylene or propylene radical, r' represents a trimethylene or propylene radical, $R_1$ represents an —r—O—r'—$NH_2$ or —r'—$NH_2$ radical, and $R_2$ represents a $C_2$–$C_4$ alkyl or phenyl, —r—O—r'—$NH_2$ or —r'—$NH_2$ radical.

8. The composition of matter as defined by claim 1 or 2, said alkenyl moiety being derived from a $C_3$–$C_{30}$ mono-olefin, an oligomer or polymer of a $C_2$–$C_{30}$ mono-olefin, or a copolymer of such olefins with a dienic or vinylaromatic comonomer.

9. The composition of matter as defined by claim 8, said alkenyl moiety being derived from oligomers or polymers of ethylene, propylene, 1-butene, isobutene, 3-cyclohexyl-1-butene or 2-methyl-5-propyl-1-hexene.

10. The composition of matter as defined by claim 2, wherein the oil is aromatic, naphthenic or paraffinic.

11. The composition of matter as defined by claim 10, the elastomer being natural, SBR, nitrile, polychloroprene or EPDM rubber.

12. The composition of matter as defined by claim 11, said alkenyl succinimide comprising from 1 to 5% by weight of the plasticizer.

13. The composition of matter as defined by claim 11, the filler being inorganic.

14. The composition of matter as defined by claim 13, said inorganic filler being calcium carbonate, kaolin, silica or silico-aluminate.

15. The composition of matter as defined by claim 14, said inorganic filler being a synthetic silica.

16. The composition of matter as defined by claim 15, the synthetic silica being precipitated silica particulates.

17. A shaped article comprising the composition of matter as defined by claim 1 or 2.

18. A vulcanized shaped article comprising the composition of matter as defined by claim 1 or 2.

* * * * *